(12) United States Patent
Hong et al.

(10) Patent No.: US 8,637,172 B2
(45) Date of Patent: Jan. 28, 2014

(54) SECONDARY BATTERY

(75) Inventors: Jintae Hong, Yongin-si (KR); Inkyu Park, Yongin-si (KR); Woonseong Baek, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1448 days.

(21) Appl. No.: 11/979,070

(22) Filed: Oct. 30, 2007

(65) Prior Publication Data

US 2008/0102357 A1    May 1, 2008

(30) Foreign Application Priority Data

Oct. 30, 2006    (KR) .................. 10-2006-0105940

(51) Int. Cl.
 *H01M 14/00*    (2006.01)
 *H01M 10/00*    (2006.01)
 *H01M 2/00*    (2006.01)
 *H01M 2/08*    (2006.01)

(52) U.S. Cl.
 USPC ............... 429/7; 429/122; 429/163; 429/175

(58) Field of Classification Search
 USPC ..................... 429/163, 176, 183, 7, 122, 175
 See application file for complete search history.

(56) References Cited

U.S. PATENT DOCUMENTS

| | | | |
|---|---|---|---|
| 2004/0076873 A1 * | 4/2004 | Chiu | 429/72 |
| 2004/0251875 A1 | 12/2004 | Kinoshita et al. | |
| 2005/0175889 A1 * | 8/2005 | Han | 429/61 |
| 2006/0099492 A1 | 5/2006 | Jeon | |

FOREIGN PATENT DOCUMENTS

| | | |
|---|---|---|
| CN | 1773747 A | 5/2006 |
| EP | 1087456 A1 | 3/2001 |
| EP | 1309020 A2 | 5/2003 |
| EP | 1657776 A2 | 5/2006 |
| JP | 2006140149 A | 6/2006 |
| KR | 20310043946 A | 5/2001 |
| KR | 10-2005-0081175 | 8/2005 |
| WO | WO 00-59064 | 10/2000 |

OTHER PUBLICATIONS

Japanese Office Action issued by JPO, dated May 10, 2011, corresponding to Japanese Patent Application No. 2007-260060, together with Request for Entry.
Chinese Office Action dated Aug. 6, 2010 issued by the SIPO corresponding to Chinese Patent Application No. 200710165492.X, together with full English version.

* cited by examiner

*Primary Examiner* — Eugenia Wang
(74) *Attorney, Agent, or Firm* — Robert E. Bushnell, Esq.

(57) ABSTRACT

The present invention relates to a secondary battery, and in particular relating to a secondary battery in which connection between the bare cell and the protection circuit can be established by a mechanical connection system without using molding method. A secondary battery of the present invention includes a bare cell in which charging and discharging can be performed, a protection circuit substrate electrically connected to the bare cell, a substrate molding body integrally formed with the protection circuit substrate, a support member having a connection unit coupled to the substrate molding body for connecting the substrate molding body to the support member, and a connection member for connecting the substrate molding body to the connection unit.

22 Claims, 12 Drawing Sheets

SECONDARY BATTERY

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on the 30th of Oct. 2006 and there duly assigned Serial No. 10-2006-0105940.

BACKGROUND OF THE INVENTION

1. Field of the Invention

The present invention relates to a secondary battery, and in particular relating to a secondary battery in which connection between the bare cell and the protection circuit can be established by a mechanical connection system without using molding method.

2. Description of the Related Art

Recently, the various types of compact and light-weight electrical and electronic devices such as a portable wireless phone, a notebook computer, a personal digital assistant (PDA), a digital camera and so on are widely developed and manufactured. A battery pack is used in order to make these portable electrical and electronic devices being able to be operated even in the places where the additional power supply is not prepared. The battery pack includes at least one battery for outputting a voltage at a constant level for driving the portable electrical and electronic devices for a predetermined period.

Furthermore, for an economical use, the battery pack can employ a secondary battery in which both of charging and discharging are available. Lithium secondary battery such as nickel-cadmium battery (Ni—Cd), nickel-hydrogen battery (Ni-MH), lithium (Li) battery and lithium ion battery and etc. can be typically used for the secondary battery.

However, the battery, as an energy source, is capable of storing a large amount of energy. The secondary battery sores a large amount of energy under the charged state, and receives energy from other energy sources while being charged. The received energy is stored in the battery. During such a process or state, if a problem of a secondary battery such an internal short state is generated, the energy stored in the battery is discharged in a very short time period and simultaneously, and therefore a safety problem such as ignition, explosion, and so on can be generated.

Because of this reason, various kinds of safety devices are provided in the secondary battery in order to prevent ignition or explosion under the charging state or during charging. The safety devices are usually connected to an anode terminal and a cathode terminal of a bare cell via a conduction structure called as a lead plate. When the voltage of the battery increases suddenly because of sharp increase of the temperature and excessive charging and discharging of the battery, the devices block the flow of the current, and thus prevent ignition and rupture of the battery. The safety devices, which can be connected to the bare cell, includes a protection circuit that detects an abnormal current or a voltage and blocks the flow of the current, a positive temperature coefficient (PTC) element that operates when overheating is generated due to an abnormal current, and a bimetal element.

A secondary battery, in which the bare cell and the safety devices are mutually connected, is embedded in a separate case, and thereby a complete exterior appearance is realized. Furthermore, there are many cases that a resin pack secondary battery in which a bare cell and a protection circuit are mutually connected by connecting a bare cell and a protection circuit substrate by welding, and injecting the molding resin into the space between them or the space of the periphery without using a separate case can be used as another type.

In the case of a resin pack secondary battery, there are merits that the external appearance can be made smooth by molding, the thickness of cab is reduced by the thickness of the case, and the inconvenience that a battery is embedded in a case is eliminated, as compared with the battery in which a core cell having the safety device mounted on the bare cell is embedded in a case.

However, in the secondary battery of a resin pack type as described above, since the molding resin portion for tightly connecting the battery elements such as the protection circuit substrate and the lead plate to the bare cell is different from a bare cell formed by a metal material such as a cap plate or a can in terms of the used materials when a pack battery is formed by connecting the bare cell and the protection circuit substrate by a resin molding, and the contact area is not so large, there is a problem that the attachment is very weak. Therefore, when an external force is applied to the secondary battery of a resin pack type, the molding resin portion of the secondary battery is removed easily from the bare cell, and this shortcoming can raise a safety issue of the secondary battery structure.

Furthermore, during the processes for positioning the secondary battery of a corepack state that the bare cell and the protection substrate are mutually connected in the metal mold, injecting the molding resin into the metal mold, and then connecting the bare cell and the protection substrate, the processes for injecting the molding resin at the uniform amount, and for coagulating the molding resin between the bare cell and the protection substrate as an uniform shape have not been performed smoothly.

Consequently, when the excessive molding resin is injected between the bare cell and the protection substrate, the exterior appearance of the completed secondary battery becomes bad, or on the contrary, when insufficient molding resin is injected between the bare cell and the protection substrate, the exterior appearance of the completed secondary battery is also bad, and the hardness of the molding resin portion is very weak, thereby the structural safety of the secondary battery is reduced remarkably.

Furthermore, after connecting the bare cell and the protection substrate through molding resin, there is a very troublesome problem that the bare cell and the protection substrate should be connected once again.

SUMMARY OF THE INVENTION

The present invention provides solutions for the problems, and the object of the present invention is to provide a secondary battery in which connection between the bare cell and the protection circuit module can be established by a mechanical connection system without using molding of a molding resin.

The object of the present invention is also to provide a secondary battery in which the connection between the bare cell and the protection circuit module is established by a mechanical connection system, and thereby the hardness is improved for resisting an external force such as bending or distortion applied to the connection portion between the bare cell and the protection circuit module.

Furthermore, the object of the present invention is also to provide a secondary battery in which the process for connecting the bare cell and the protection circuit module can be performed easily, the connection state can be made excellent even when the connection state between the bare cell and the protection circuit module is bad, and separation and re-connection of the bare cell and the protection circuit module can be easily executed if necessary.

In order to accomplish above objects, the present invention provides a secondary battery including a bare cell for storing electricity, a protection circuit substrate electrically connected to the bare cell where the protection circuit substrate includes a protection circuit for the bare cell, a substrate molding body formed in the protection circuit substrate, a support member coupled to the bare cell where the support member having a connection unit that is coupled to the substrate molding body, and a connection member for connecting the substrate molding body to the connection unit.

The support member has a base unit that is connected to a first surface of the bare cell, and the connection unit extends toward the substrate molding body from the base unit. The support member may have a second connection unit, and the substrate molding body may be disposed between the connection unit and the second connection unit while being coupled to the support member. The secondary battery may further include a second support member coupled to the bare cell where the second support member has a connection unit that is coupled to the substrate 3 molding body.

The connection member may include a connection bolt for connecting the connection unit of the support member to the substrate molding body. A screw hole may be formed on a side of the substrate molding body and a connection hole is formed on the connection unit of the support member where the connection bolt penetrates into the screw hole and the connection hole. A nut may be formed inside the screw hole where the connection bolt is coupled to the nut while the substrate molding body is being connected to the connection unit.

The secondary battery may further include a second support member coupled to each of the bare cell and the substrate molding body. The support member is arranged along a side of the first surface of the bare cell, and the second support member is arranged along another side of the first surface of the bare cell. The support member and the second support members may face each other across the first surface of the bare cell. The first surface of the bare cell may have a quadrilateral shape having a longer side and a shorter side, and the support member is arranged along the longer side of the first surface of the bare cell. The support member can be arranged along the shorter side of the first surface of the bare cell.

The secondary battery may further include a second support member coupled to each of the bare cell and the substrate molding body. Both of the support member and the second support member may be arranged along one side of the first surface of the bare cell.

The base unit may be welded to the first surface of the bare cell. The base unit can be welded to the first surface of the bare cell by a resistance welding.

The secondary battery may further include an adhesion layer that is disposed between the base unit and the first surface of the bare cell. The base unit adheres to the first surface of the bare cell through the adhesion layer.

The substrate molding body can be seamlessly and integrally formed with the protection circuit substrate by injection.

Another aspect of the present invention provides a secondary battery including a bare cell for storing electricity, a protection circuit substrate electrically connected to the bare cell where the protection circuit substrate includes a protection circuit for the bare cell, a substrate molding body formed in the protection circuit substrate, a support member having a hook unit and a first fixing unit that is connected to a first end of the hook unit where the first fixing unit is connected to a first surface of the bare cell and the hook unit is coupled to the substrate molding-body, and a connection member for connecting the substrate molding body to the hook unit.

The substrate molding body may have a through hole through which the connection member is coupled. The support member may have a second fixing unit that is connected to a second end of the hook unit. The second fixing unit is connected to the first surface of the bare cell, and a connection hole is formed being surrounded by the hook unit and the first surface of the bare cell. The connection member may include a connection pin that is disposed inside the through hole and the connection hole. The width of the through hole may be formed to be equal to or smaller than the size of the cross-section of the connection pin. The connection hole may have a shape of a semi-circle or polygon.

The connection member may include a connection band that penetrates the through hole and is coupled to the hook unit. The connection band wraps a portion of a surface of the substrate molding body.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, the preferred embodiment of the present invention will be described in detail with reference to the accompanying drawings.

Figure 1:
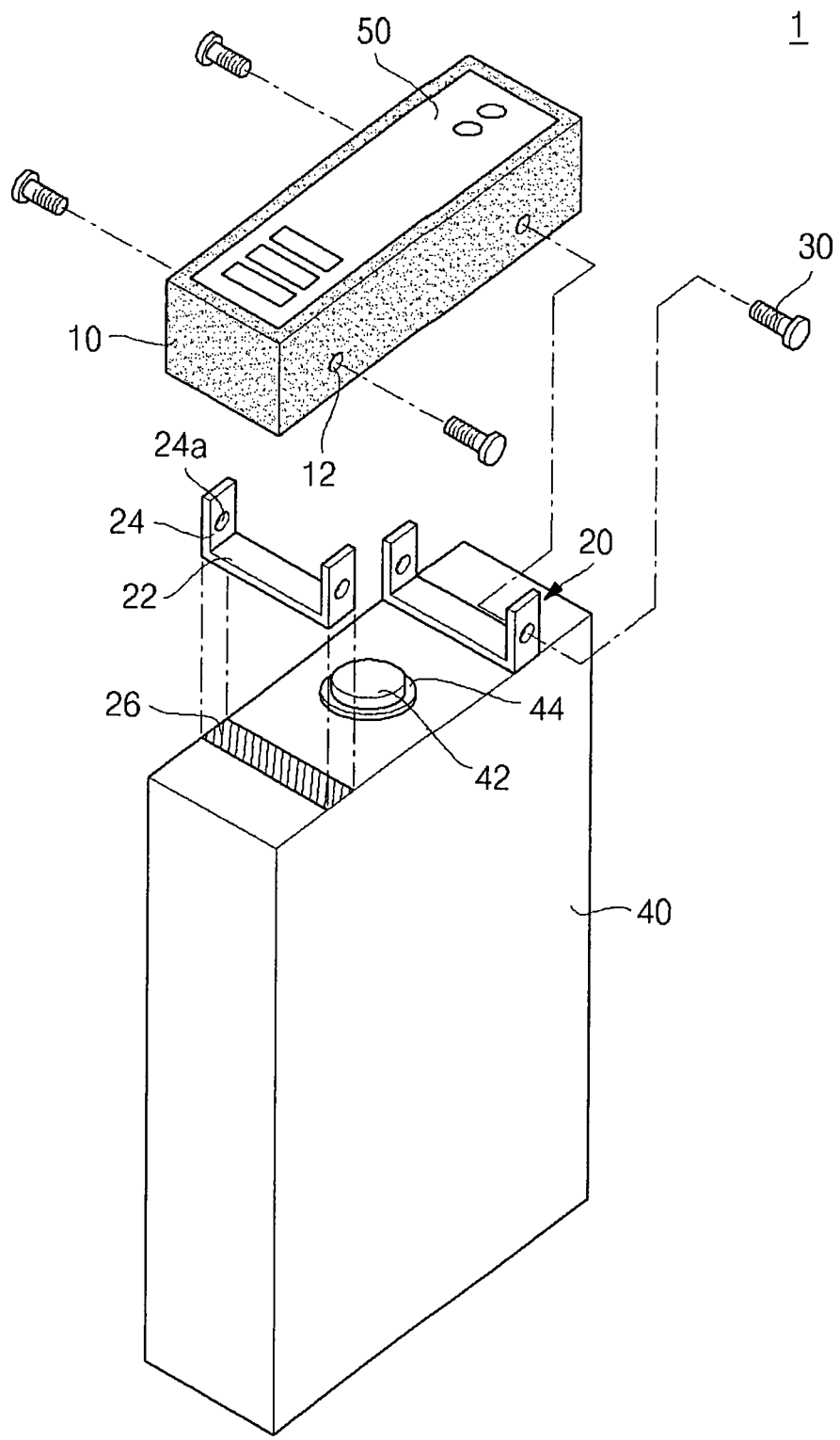
FIG. 1 is an exploded perspective view for illustrating an embodiment of a secondary battery according to the present invention.
Figure 2:
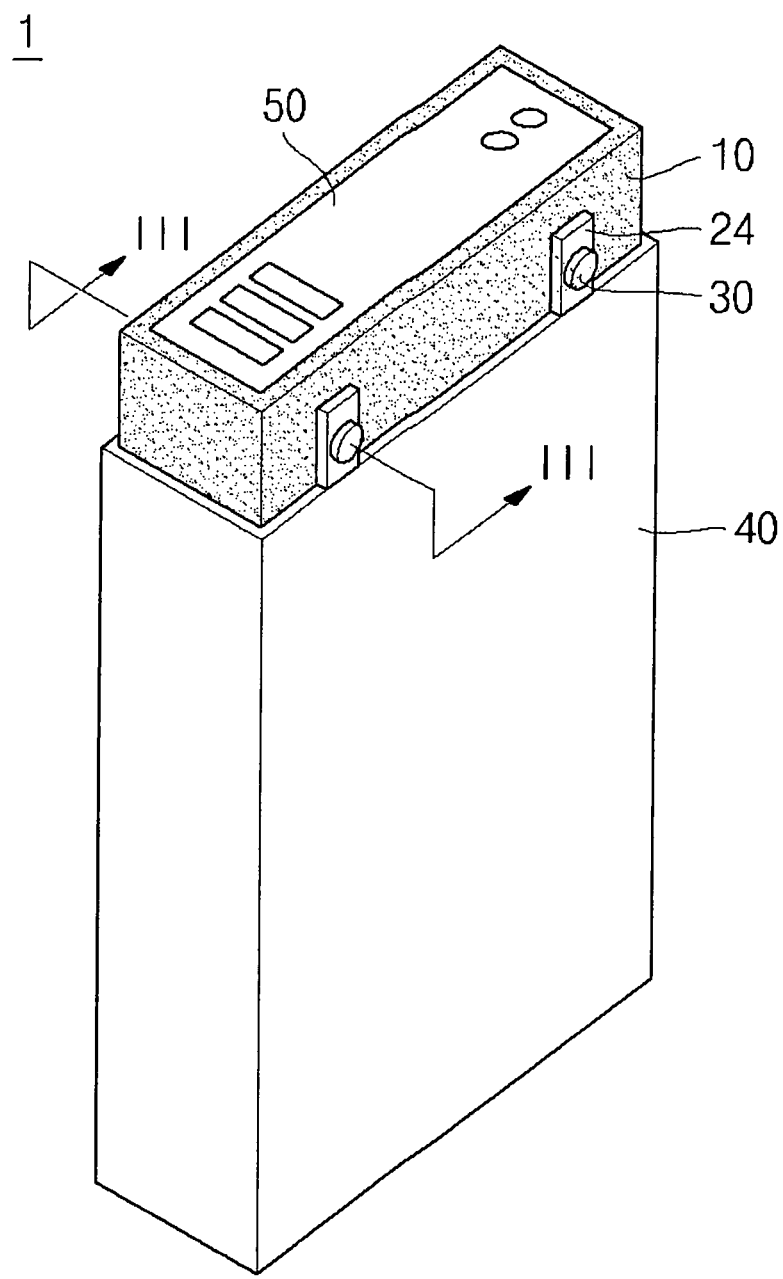
FIG. 2 is a perspective view of a connection structure of a secondary battery according to an embodiment of FIG. 1.
Figure 3:
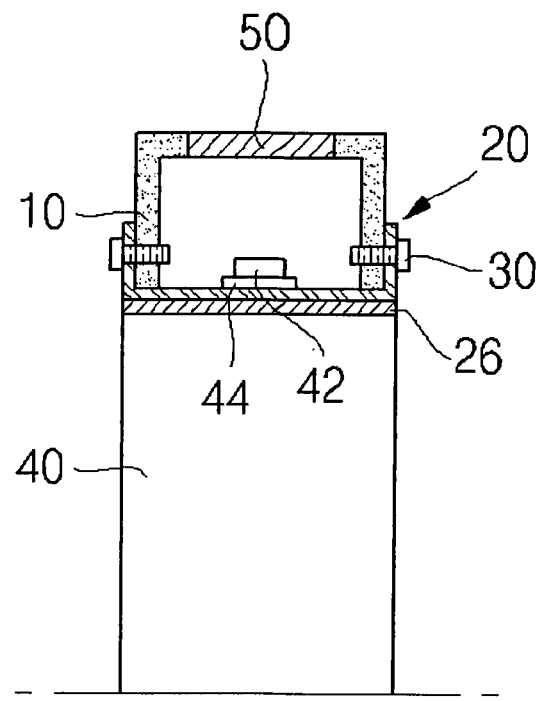
FIG. 3 is a cross-sectional view of III-III line of FIG. 2.

FIG. 1 is an exploded perspective view for illustrating an embodiment of a secondary battery according to the present invention, FIG. 2 is a perspective view of a connection structure of a secondary battery according to an embodiment of FIG. 1, and FIG. 3 is a cross-sectional view of III-III line of FIG. 2.

As described in FIGS. 1 through 3, the secondary battery 1 of the present invention includes a bare cell 40, a protection circuit substrate 50, a substrate molding body 10 integrally formed with the protection circuit substrate 50, a support member 20, and a connection member.

Charging and discharging can be performed in the bare cell 40, and an electrode terminal 42 is connected to one surface of the bare cell 40 through an insulation gasket 44, thereby insulation is maintained.

The substrate molding body 10 is integrally formed with the protection circuit substrate 50, and thus is connected to one surface of the bare cell 40 by a mechanical connection method. Here, the substrate molding body 10 can be integrally formed with the protection circuit substrate 50 through injection molding method. The support member 20 is connected to the bare cell 40 for coupling the substrate molding body 10 to one surface of the bare cell 40, and thus includes a connection unit 24 that connects the substrate molding body 10 to one surface of the bare cell 40.

As shown in FIG. 1, the bare cell 40 has a top surface, bottom surface, and side surface. The substrate molding body 10 is installed on the top surface of the bare cell 40, and the support member is coupled to each of the bare cell 40 and the substrate molding body 10 to connect the substrate molding body 10 to the bare cell 40.

Referring to the support member 20 as described above, the support member 20 includes a base unit 22 that is connected to the top surface of the bare cell 40, and a connection unit 24 that extends towards the substrate molding body 10 from the base unit 22 along the direction perpendicular to the top surface of the bare cell 40. In addition, as shown in FIG. 1, connection unit 24 is arranged at each end of the base unit 22. The pair of the connection units 24 are arranged to be parallel to each other. Two or more connection units 24 can be employed to the base unit 22. If two connection units 24 are formed at each end of the base unit 22, the substrate molding body 10 is inserted between the two connection units, and connected to the connection units 24 through a connection member 30 (in this case, a connection bolt) and a connection hole 24a. In the present embodiment, a pair of the connection units 24 are arranged parallel to each other, and the substrate molding body 10 is inserted into a space surrounded by the pair of the connection units 24 and the base unit 22. The connection is completed established by connection members 30.

Furthermore, the horizontal cross-section (cross-section parallel to the top surface of the bare cell) of the base unit 22 is formed as rectangular shape, and the pair of the connection units extends from end sides of the base unit 22 in rectangular shape. Therefore, the substrate molding body 10 is inserted into a space formed by the pair of the connection units 24 extending from the end sides of the base unit 22 and the base unit 22 in rectangular shape, and connection is established by connection members.

Additionally, the present embodiment has a structure in which the support member 20 including the base unit 22 having a rectangular shape is connected to the bare cell 40, and the support member 20 is fixed to the bare cell 40 in a manner that a long side of the base unit 22 extends along a thickness direction of the bare cell 40. In this embodiment, the base unit 22 is coupled to one surface (top surface) of the bare cell 40. The element 26 refers to a welding part. Also in this embodiment, a pair of support members are formed on the top surface of the bare cell 40. The support members are symmetrically arranged about the electrode terminal 42.

Moreover, because the support member 20 is an element for fixing the substrate molding body 10, which is integrally formed with the protection circuit substrate 50, to the bear cell 40, it is preferable that the support member 20 is mounted on the surface on which the electrode terminal 42 of the bear cell 40 is arranged. Furthermore, the support member 20 can be formed as a pair, and can be formed on the both sides of the electrode terminal 42 on one surface of the bear cell 40.

More than a pair of support members also can be coupled to the bare cell 40. But in the present embodiment, because the support member is arranged on both sides of the electrode terminal 42 of the bare cell 40, the support members have sufficient stability and rigidity against the substrate molding body 10, and the installation process of the support members on the bare cell 40 can be easily executed. Therefore, it is sufficient to have a pair of the support members that are arranged on both sides of the electrode terminal 42.

The connection member 30 can be a connection bolt, and the connection bolt is coupled to the connection unit 24 of the support member 20 and the substrate molding body 10. The connection bolt penetrates through the connection unit 24 through a connection hole 24a, and a lateral side of the substrate molding body 10 through screw hole 12. For this purpose, a screw hole 12 for the connection bolt can be formed on two opposite sides of the substrate molding body 10.

Figure 4:
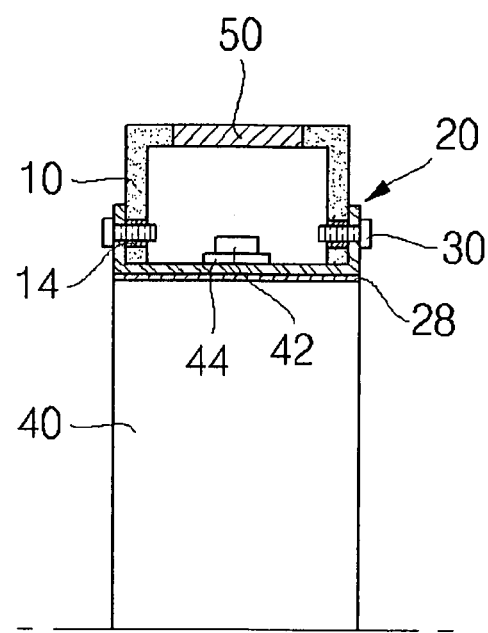
FIG. 4 is a cross-sectional view illustrating another example of a connection member of a secondary battery according to an embodiment of FIG. 1.

As illustrated in FIG. 4, a nut 14 for connection bolt can be integrally formed in the substrate molding body 10. Connection bolt is inserted into the nut 14 of the substrate molding body 10, and thereby the connection between the connection unit 24 of the support member 20 and the substrate molding body 10 is established. The base unit 22 can be coupled to one surface of the bare cell 40 via an adhesion layer 28.

Figure 5:
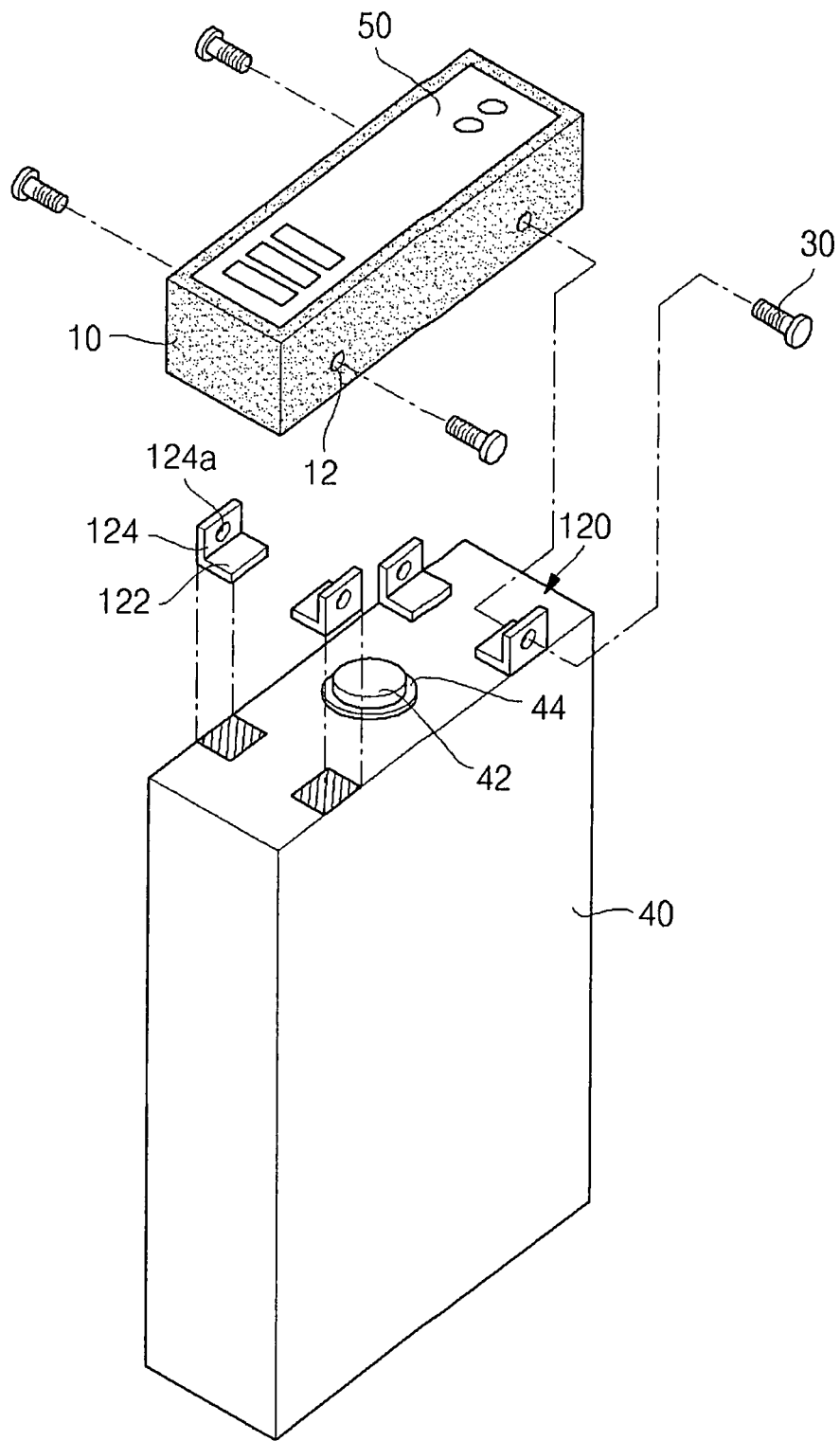
FIG. 5 is an exploded perspective view illustrating another embodiment of a secondary battery according to the present invention.
Figure 6:
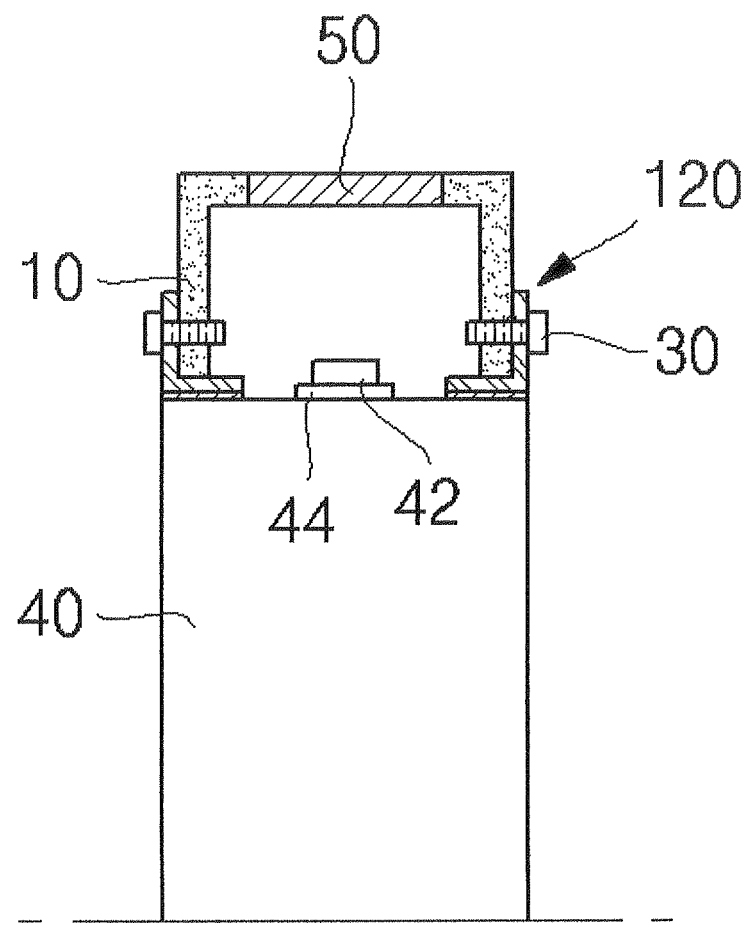
FIG. 6 is a cross-sectional view illustrating a connection structure of a secondary battery according to an embodiment of FIG. 5.

FIG. 5 and FIG. 6 illustrate a diagram describing another embodiment of the secondary battery according to the present invention. As illustrated in FIGS. 5 and 6, the support member 120 includes a base unit 122 which is connected to the top surface of the bare cell 40, and the connection unit 124 is extended toward the substrate molding body 10 from the base unit 122 along a direction perpendicular to the top surface. The connection unit 124 has a connection hole 124a in through which a connection member 30 is inserted. A pair of or more than a pair of connection units 124 can be formed on the top surface of the bare cell 40.

In this embodiment, the support member can be positioned in one side of the top surface of the bare cell (for example, along an edge connected to the front side surface of the bare cell 40). In this case, one lateral side of the substrate molding body is connected to the connection unit of the support member, and thus the substrate molding body can be installed on the top surface of the bare cell. However, because a pair of support members on both opposite sides of the top surface of the bare cell improves the stability of the installation of the substrate molding body on the top surface of the bare, it is preferable that a pair or more than a pair of support members are symmetrically formed on the top surface of the bare cell 40 about the electrode terminal 42. FIG. 4, for example, shows two support members that are arranged on one side of the top surface of the bare cell, and another two support members that are arranged on another side of the top surface of the bare cell. One support member on the one side of the top surface forms a pair with another support member formed on the another side of the top surface. The substrate molding body 10 is inserted between the connection units of the support members.

In the present embodiment, a structure in which the support member 120 is connected to one surface of the bare cell is taken as an example, and because the support member 120 is an element for fixing a substrate molding body 10, which is formed on the protection circuit substrate 50, to the bare cell 40, it is preferable that the support member 120 is formed on the surface on which the electrode terminal 42 of the bare cell 40 is provided.

Referring to FIGS. 5 and 6, one pair of support members 120 is arranged on one side of the electrode terminal 42, and another pair of support members 120 is arranged on another side of the electrode terminal 42. In each of the pairs of the support members, one support member is arranged on one side of the top surface of the bare cell 40, and another support member is arranged on another side of the top surface of the bare cell 40. The substrate molding body 10 is inserted between these two support members 120 arranged on the opposite sides of the top surface of the bare cell 40 in a thickness direction of the bare cell 40. Therefore, each lateral side of the substrate molding body 10 is connected to one of connection units of these support members.

Here, a structure can be employed in which the base unit 122 of the support member 120 is formed in a rectangular shape, and the connection unit 124 extends from one longer side of the base unit 122 having a rectangular shape. In other words, the longer side of the base unit 122 is formed along an edge of the top surface of the bare cell 40, and a shorter side of the base unit 122 extends inside the top surface from the edge of the top surface, which can be viewed as a thickness direction of the bare cell 40.

Figure 7:
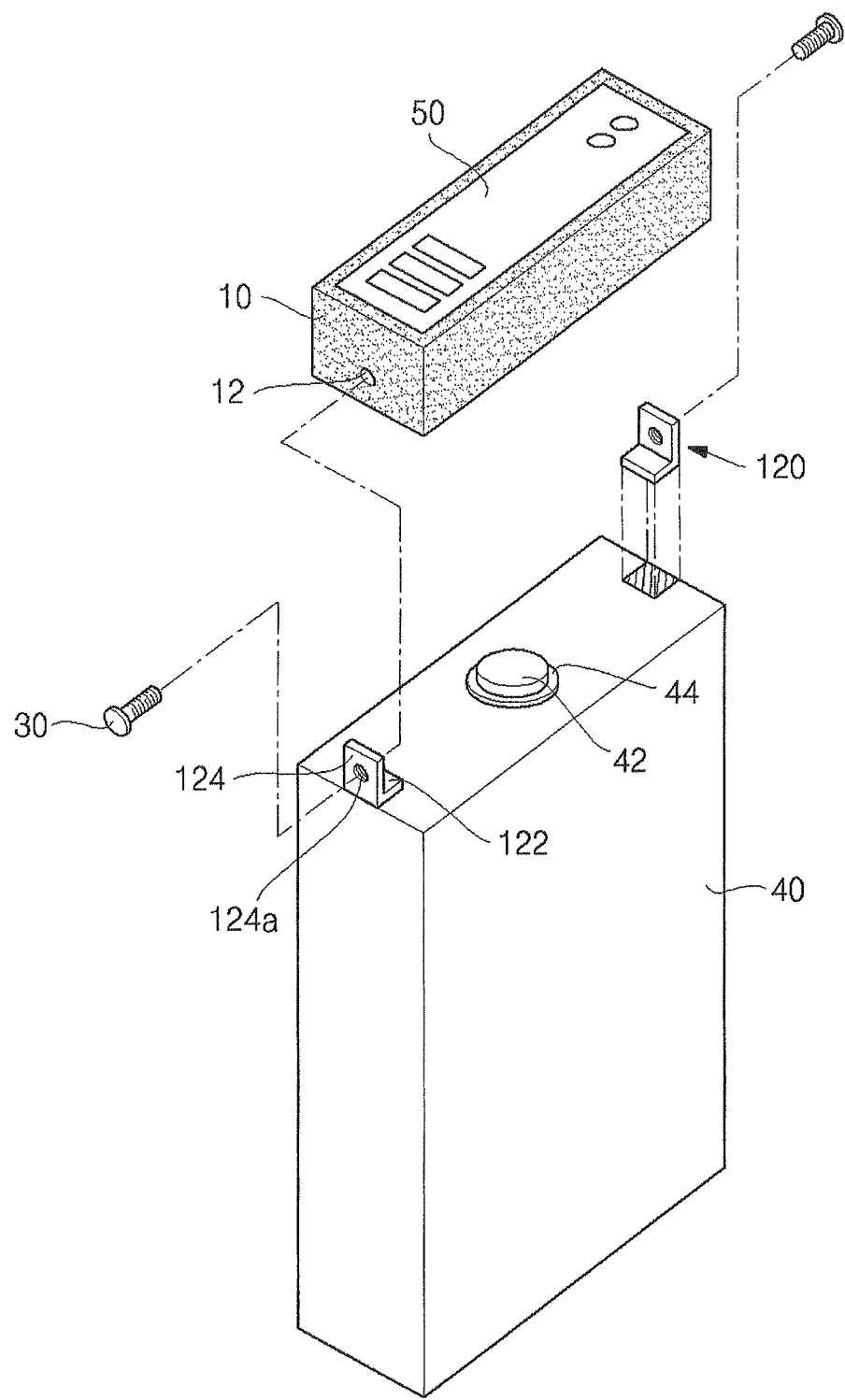
FIG. 7 is an exploded perspective view illustrating another embodiment of a secondary battery according to the present invention.
Figure 8:
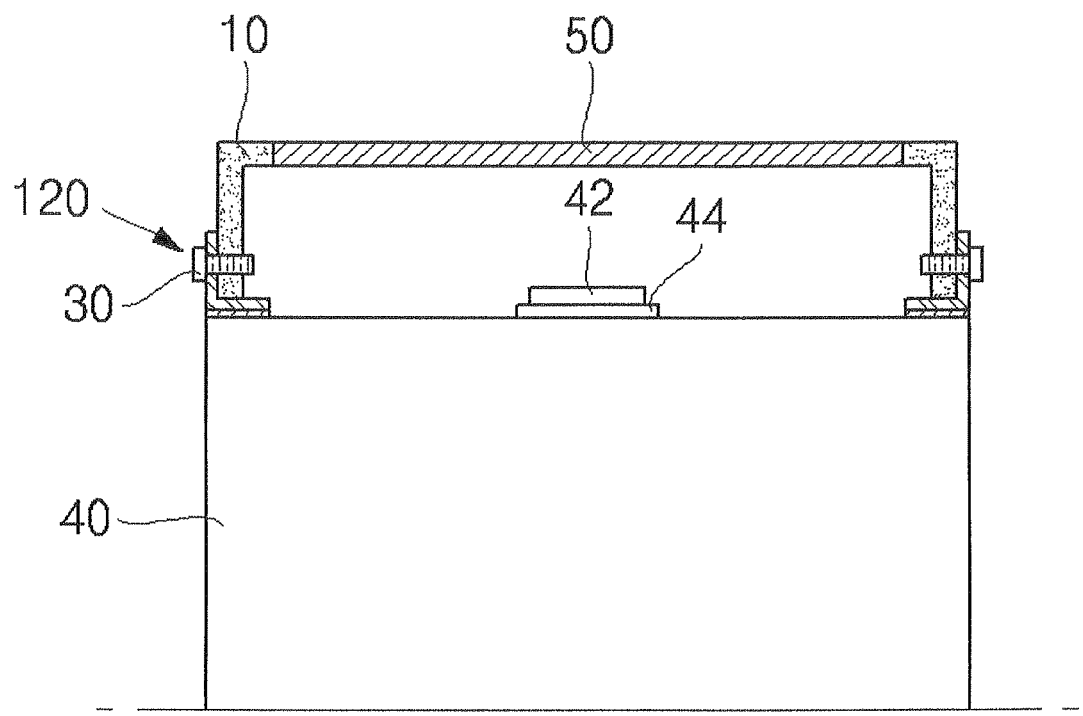
FIG. 8 is a cross-sectional view illustrating a connection structure of a secondary battery according to an embodiment of FIG. 7.

FIG. 7 and FIG. 8 illustrate an embodiment in which the support member is formed along different side of the top surface of the bare cell 40 from the side shown in FIGS. 5 and 6. Herein, it can be described that the support member shown in FIGS. 7 and 8 is arranged along a thickness side (or edge) of the top surface of the bare cell 40, while the support member shown in FIGS. 5 and 6 is arranged along a width side (or edge) of the top surface of the bare cell 40. The thickness side and the width side are relatively defined. That is, one side of the top surface is a width side, another side, which is substantially perpendicular to the width side, is a thickness side of the top surface. As illustrated in FIGS. 7 and 8, the support members 120 can be symmetrically arranged on both thickness sides of the top surface about the electrode 42. Further, the substrate molding body 10 is inserted between the support members 120 symmetrically arranged on both thickness sides, and the substrate molding body 10 is connected to each of the support members through the side surface that is substantially parallel to the width side of the top surface. Therefore, a screw hole 12 is formed on a side of the substrate molding body 10 that is parallel to the thickness side of the bare cell 40, and the substrate molding body 10 is connected to each of the support members through the connection member 30. The connection unit 124 has a connection hole 124a in through which a connection member 30 is inserted.

Furthermore, in the embodiments described above, it is described that the bare cell has a shape of a box or rectangular parallelopiped, and the top surface of the bare cell 40 is substantially a rectangular shape. The shape of the bare cell is, however, not limited to this shape. For example the top surface of the bare cell can be hexagon or octagon. In this case, the width or thickness sides can be defined as one of sides of the geometrical shape, and the width and thickness sides do not need to be perpendicular. Regardless of the shape of the top surface of the bare cell, the support members shown in FIGS. 1 through 8 can be symmetrically arranged according to the principles of the present invention. The support member can be arranged along an edge of the top surface or can be arranged slightly being retreated inside the top surface from the edge of the top surface.

Figure 9:
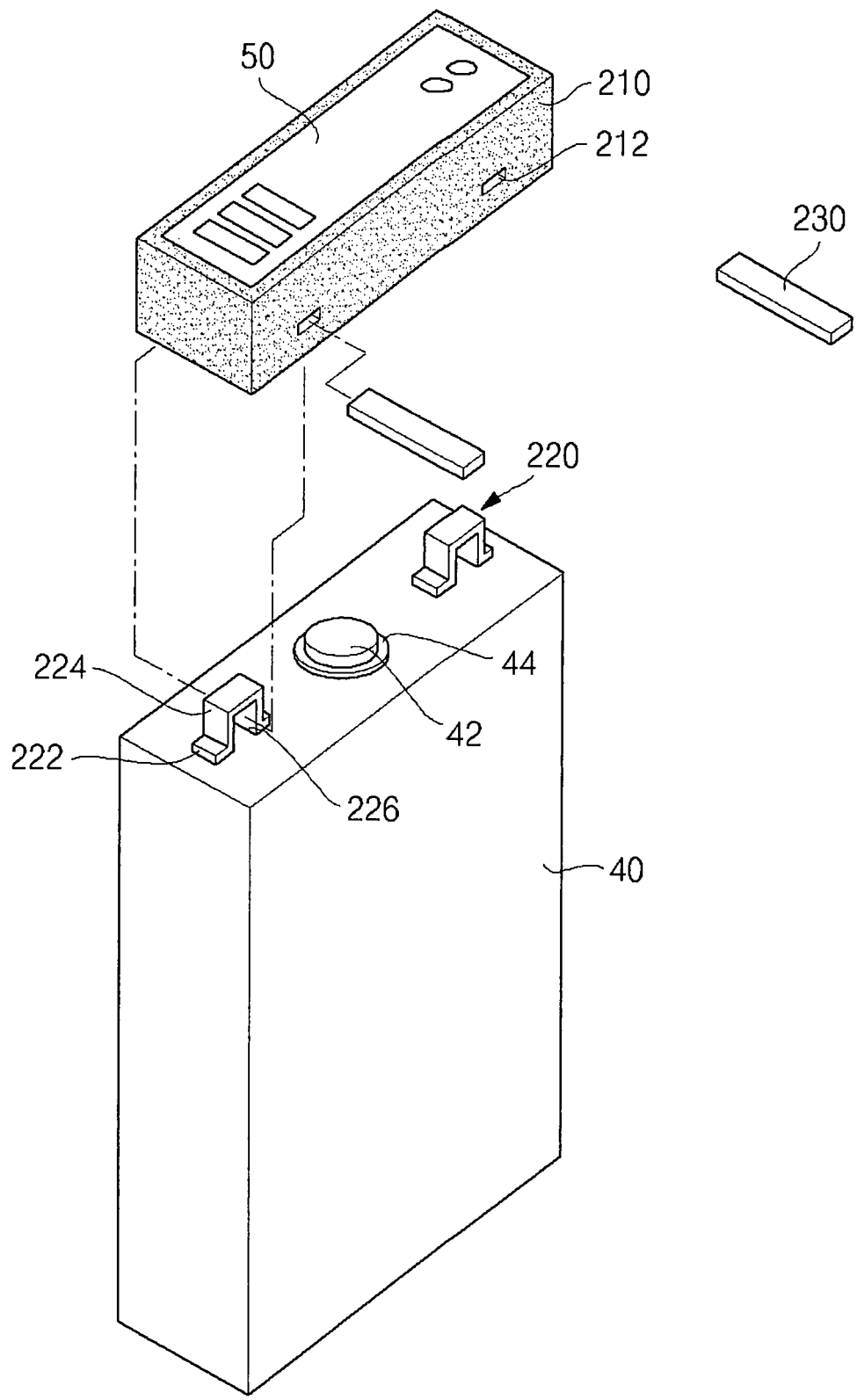
FIG. 9 is an exploded cross-sectional view illustrating another embodiment of a secondary battery according to the present invention.
Figure 10:
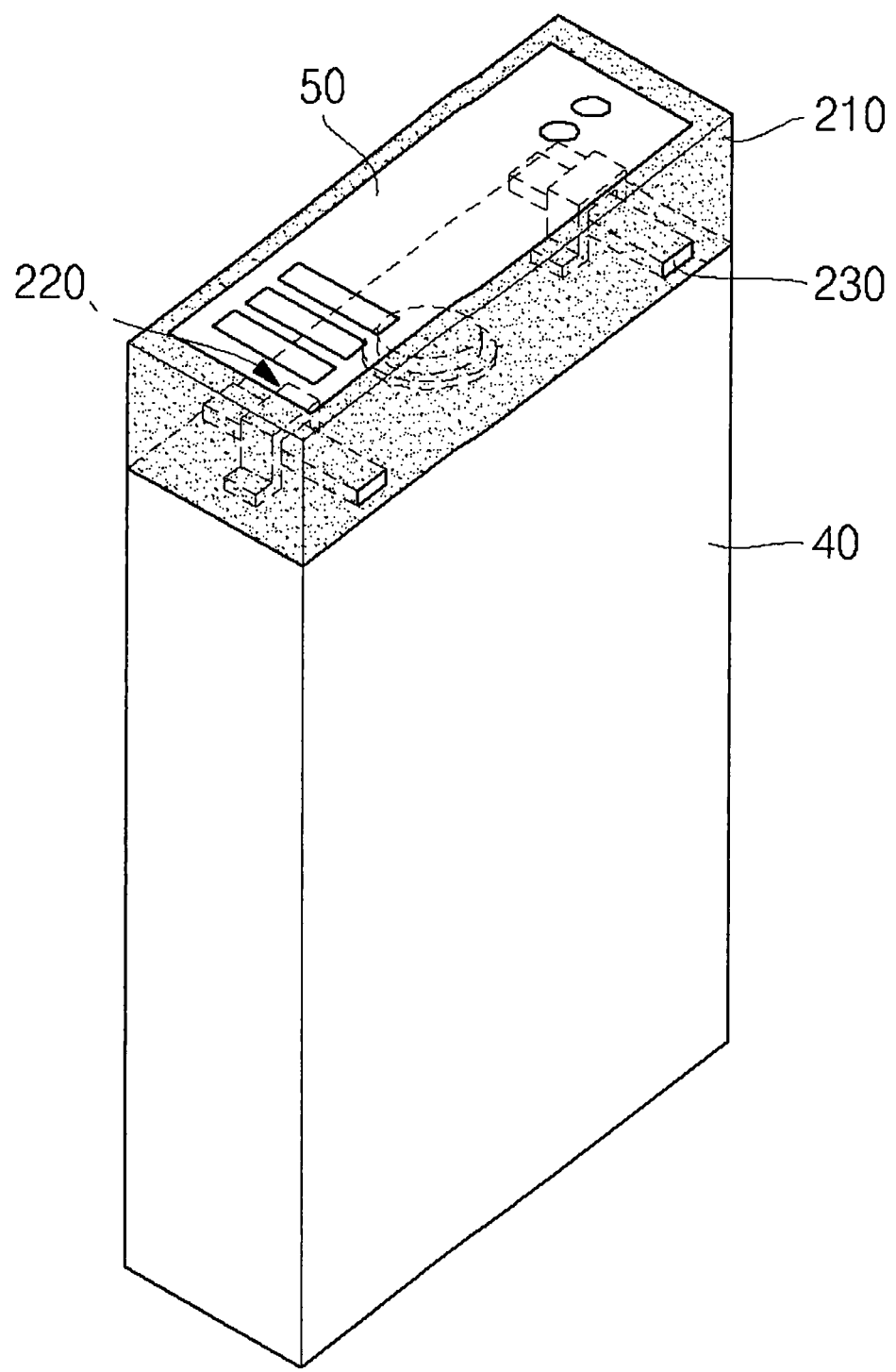
FIG. 10 is a cross-sectional view illustrating a connection structure of a secondary battery according to an embodiment of FIG. 9.
Figure 11:
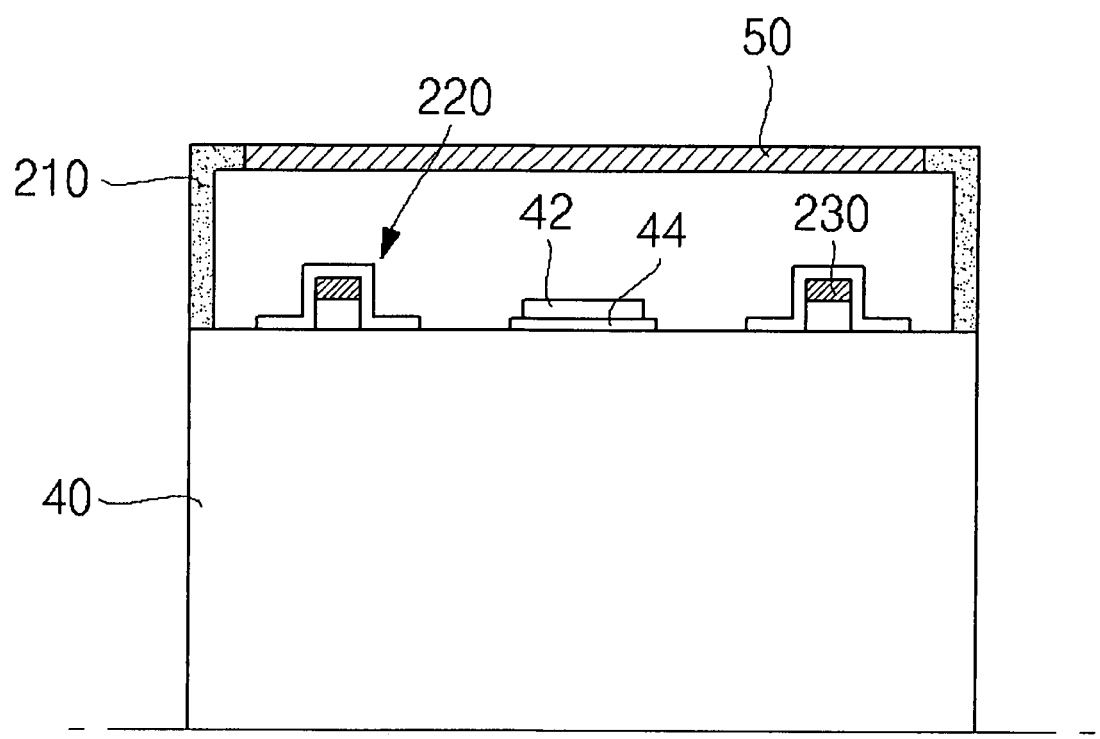
FIG. 11 is a lateral cross-sectional view illustrating the main portions of FIG. 10.

FIGS. 9, 10, and 11 illustrate a diagram describing another embodiment of a secondary battery according to the present invention. As illustrated in FIGS. 9, 10, and 11, the support member 220 of this embodiment includes a hook unit 224, which has a shape of an inverted U-shaped bracket, and a pair of fixing units 222, which formed as bases connected to the bottom ends of the inverted U-shaped bracket. The support member 220 is formed on a top surface of the bare cell 40 with the fixing units 222 connected to the top surface. Therefore a space is formed between the hook unit 224 and the top surface of the bare cell 40. That is to say, the space is enclosed by the hook unit 224 and the top surface as shown in FIG. 9. Generally, the hook unit 224 can have a shape that is slightly curved or bent plate, and fixing units 222 are formed at both ends of the bent plate. Therefore, if the fixing units 222 are connected on the top surface of the bare cell 40, the hook unit 224 having a shape of a bent plate form a space, which is referred to as a connection hole 226. The cross-sectional shape of the connection hole 226 can be a semi-circle or trapezoid, depending on the shape of the hook unit 224.

In this case, a connection member for connecting the support member 220 and the lateral side of the substrate molding body 210 can be a connection pin 230. That is, the connection pin 230 having a cross-section shape corresponding to the horizontal cross-section shape of the hook unit 224 of the support member 220 is provided, and the connection pin 230 is inserted by penetrating through one lateral side of the substrate molding body 210, the connection hole 226 formed inside the hook unit 224 of the support member 220, and the other lateral side of the substrate molding body 210, sequentially. At this time, both ends of the connection pin 230 are supported on one lateral side of the substrate molding body 210, and one surface thereof is supported against the inner side of the connection hole 226 of the support member 220.

Therefore, the connection pin 230 supports two opposite lateral sides of the substrate molding body 210 via both ends thereof while the connection pin 230 is inserted the support member 20 which is connected to one surface of the bare cell 40, and thus the substrate molding body 210 is connected to one surface of the bare cell 40 without being separated from the bare cell 40.

A through hole 212 is formed on the two opposite lateral sides of the substrate molding body 210 for insertion and support of the connection pin 230, and at this time, the cross-section shape of the through hole 212 corresponds to the vertical cross-section shape of the connection pin 230, and the distance between the surface of the substrate molding body 210 contacting to one surface of the bare cell 40 and the through hole 212 corresponds to the height of the fixing unit 222 of the support member 220 when designating one end of the substrate molding body 210 contacting to one surface of the bare cell 40 as a reference.

The reason for this is as follows. Even if the connection pin 230 is formed as a structure having the sharp ends, because it is not easy to insert the pin into the lateral side of the substrate molding body 210, a through hole 212 of the shape corresponding to the shape of the insertion hole 226 of the support member 220 is formed on two opposing lateral sides of the substrate molding body 210, thereby a process for supporting the substrate molding body 210 against one surface of the bare cell 40 can be easily executed by inserting the connection pin 230 into the substrate molding body 210 and the support member 220.

In addition, because the connection pin 230 can be easily inserted via the through hole 212 of the substrate molding body 210, even if it is formed as being soft in terms of hardness, it can exhibit the support function against the substrate molding body 210 sufficiently, and thus the connection pin 230 can be manufactured by injection molding like the substrate molding body 210. That is, the materials necessary of forming the connection pin 230 can be identical to those employed for forming the substrate molding body 210, and therefore, facilitation of abrasion of the substrate molding body 210, and reduction of support force of the connection pin 230 against the substrate molding body 210 which can be generated due to the connection pin 230 when forming the connection pin by using very hard materials as compared with the substrate molding body 210 can be prevented.

Furthermore, in this way, since the width of the through hole 212 formed in the substrate molding body 210 is formed as being equal to or less than the cross-section area of the connection pin 230, the connection pin 230 is closely attached to the inner side of the through hole 212, and is inserted into the through hole 212 and the insertion hole 226 of the support member 220, and thereby the supporting function against the substrate molding body 210 can be performed excellently.

Furthermore, in the present embodiment, an example is explained in which the support member 220 and the connection pin 230 functioning as a connection member are applied to the bare cell 40 in polygonal shape. Therefore, the support member 220 is formed as a pair on both ends of one surface on which the electrode terminal 42 of the bare cell 40 in polygonal shape is provided with centering around the electrode terminal 42, and the substrate molding body 210 is connected to one surface of the bare cell 40 while the substrate molding body 210 is supporting both ends of one surface on which the electrode terminal 42 of the bare cell 40 in polygonal shape is provided with centering around the electrode terminal 42 by using a pair of the connection pins 230 and a pair of the support member 220.

Furthermore, in the present embodiment, the support member 220 and the connection pin 230 are formed as a pair arranged on both sides with centering around the electrode terminal 42, but it is not limited to this structure, and it is natural that they can be formed at many positions if necessary.

Figure 12:
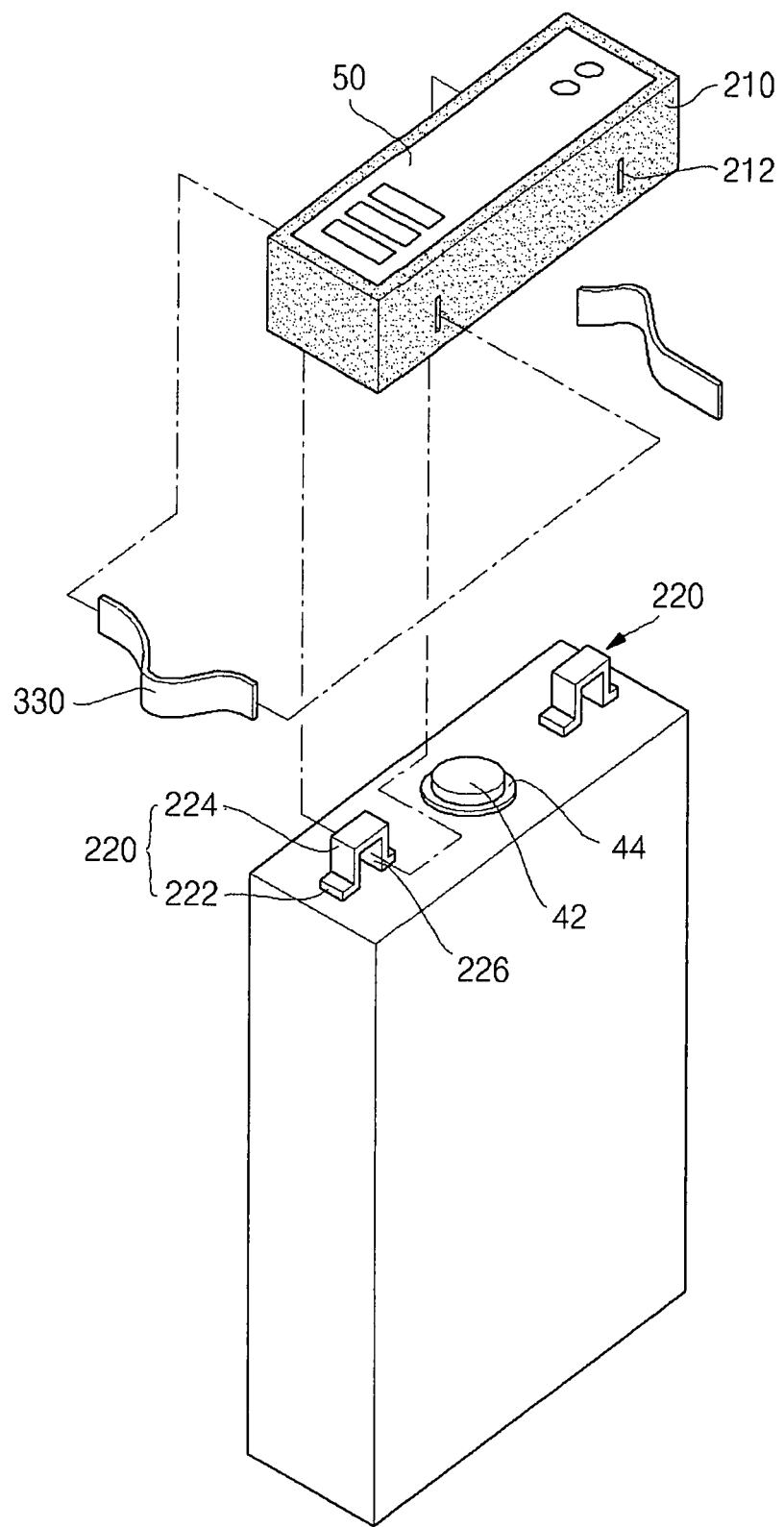
FIG. 12 is an exploded cross-sectional view illustrating another embodiment of a secondary battery according to the present invention.
Figure 13:
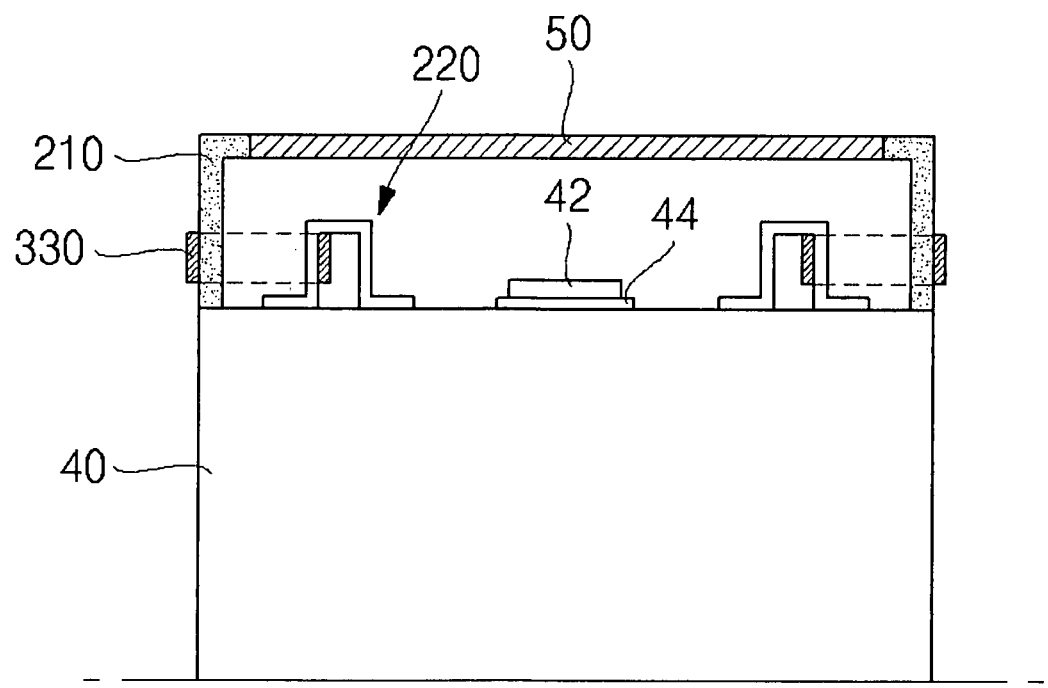
FIG. 13 is a lateral cross-sectional view of a secondary battery according to an embodiment of FIG. 12.
Figure 14:
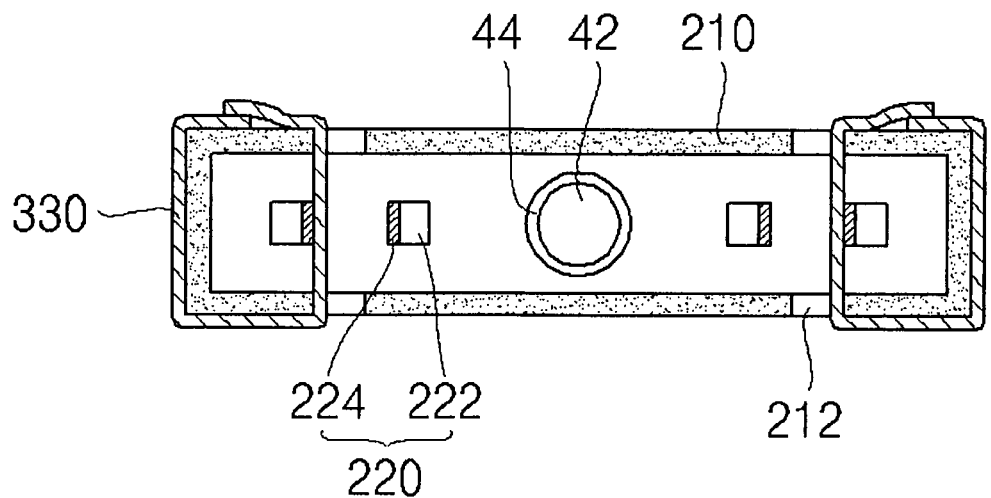
FIG. 14 is a plane cross-sectional view of a secondary battery according to an embodiment of FIG. 12.

FIGS. 12 through 14 illustrate a diagram describing another embodiment of a secondary battery according to the present invention. As illustrated in the drawings, the support member 220 has a structure which is identical to those of the support members of the embodiments shown in FIG. 9 and FIG. 10, and a connection member for connecting the substrate molding body 210 to one surface of the bare cell 40 via such a support member 220 comprises a connection band 330. That is, the connection band 330 connects the substrate molding body 210 to the support member 220 tightly via the through hole 212 formed on both opposing sides of the substrate molding body 210, and the connection hole 226 formed inside the hook unit 224 of the support member 220. In other words, the a structure can be realized in which the substrate molding body 210 is connected and fixed to the bare cell 40 via the connection band 230 and the support member 220.

According to the structure of the above embodiments, since the bare cell and the protection circuit substrate are connected as a mechanical connection structure comprising a substrate molding body, a support member and a connection mean, a tightly connected structure can be maintained as compared with the conventional structure for connecting the bare cell and the protection circuit substrate by a molding resin. Therefore, intensity of resistance of the connection portion where the bare cell and the protection circuit substrate are connected mutually is improved against the external force such as distortion or bending applied to the connection portion. For example, injection process of molding resin could not be performed smoothly during a conventional molding process for the bare cell and the protection circuit substrate, and the phenomenon took place that the connection state between the bare cell and the protection circuit substrate can become very bad due to such an insufficient molding resin, but in the present invention, this problem is excluded from the beginning.

Furthermore, the problem can be excluded initially that excessive injection of the molding resin is performed during a molding process for the bare cell and the protection circuit substrate, and thus the connection portion between the bare cell and the protection circuit substrate becomes bad.

Moreover, if the connection state between the bare cell and the protection circuit substrate is not so excellent, it is possible to connect them once again after separating them, and the process for connecting the bare cell and the protection circuit substrate once again can be easily executed after separating the bare cell and the protection circuit substrate if necessary.

As known by the embodiments described above, in the secondary battery according to the present invention, since the bare cell and the protection circuit substrate are connected by a mechanical connection structure, and thus the process for connecting the bare cell and the protection circuit substrate can be executed many times at the same time without any restrictions if necessary, a secondary battery can be realized in which the connection portion between the bare cell and the protection circuit substrate is always maintained as a excellent state.

Furthermore, since the connection force between the bare cell and the protection circuit substrate does not always depend on the molding portion having a relatively weak hardness, and they are connected through the connection between the frame molded by injection, and the support member having a predetermined hardness, the connection force is improved, and hardness for resisting the external force such as bending or distortion applied to the connection portion between the bare cell and the protection circuit module is improved.

Moreover, if necessary, since separation and re-connection of the bare cell and the protection circuit module can be easily executed, there is an effect that a repair operation or a maintenance operation can be easily executed when some technical problems are generated in the protection circuit module as well as the protection circuit substrate while using the secondary battery.

What is claimed is:

1. A secondary battery comprising:
 a bare cell for storing electricity;
 a protection circuit substrate electrically connected to the bare cell, the protection circuit substrate including a protection circuit for the bare cell;
 a substrate molding body formed in the protection circuit substrate;
 a first support member coupled to the bare cell, the first support member having a first connection unit that is coupled to the substrate molding body and a base unit having an area that is connected to a first surface of the bare cell, the first connection unit extending from the base unit in a direction perpendicular to the first surface, the first connection unit being disposed on an outer surface of the substrate molding body; and
a connection member for connecting the substrate molding body to the first connection unit.

2. The secondary battery according to claim 1, wherein the first support member has a second connection unit; and
the substrate molding body is disposed between the first connection unit and the second connection unit while being coupled to the first support member.

3. The secondary battery according to claim 2, further comprising:
a second support member coupled to the bare cell, the second support member having a first connection unit that is coupled to the substrate molding body.

4. The secondary battery according to claim 1, wherein the connection member includes a connection bolt for connecting the first connection unit of the first support member to the substrate molding body.

5. The secondary battery according to claim 4, wherein a screw hole is formed on a side of the substrate molding body and a connection hole is formed on the first connection unit of the first support member, the connection bolt penetrating into the screw hole and the connection hole.

6. The secondary battery according to claim 5, wherein a nut is formed inside the screw hole, the connection bolt being coupled to the nut while the substrate molding body is being connected to the first connection unit.

7. The secondary battery according to claim 1, further comprising:
a second support member coupled to each of the bare cell and the substrate molding body, the first support member being arranged along a side of the first surface of the bare cell, the second support member being arranged along another side of the first surface of the bare cell.

8. The secondary battery according to claim 7, wherein the first support member and the second support members face each other across the first surface of the bare cell.

9. The secondary battery according to claim 8, wherein the first surface of the bare cell has a quadrilateral shape having a longer side and a shorter side, the first support member being arranged along the longer side of the first surface of the bare cell.

10. The secondary battery according to claim 8, wherein the first surface of the bare cell has a quadrilateral shape having a longer side and a shorter side, the first support ember being arranged along the shorter side of the first surface of the bare cell.

11. The secondary battery according to claim 1, further comprising:
a second support member coupled to each of the bare cell and the substrate molding body, both of the first support member and the second support member being arranged along one side of the first surface of the bare cell.

12. The secondary battery according to claim 1, wherein the base unit is welded to the first surface of the bare cell.

13. The secondary battery according to claim 12, wherein the base unit is welded to the first surface of the bare cell by a resistance welding.

14. The secondary battery according to claim 1, further comprising:
an adhesion layer that is disposed between the base unit and the first surface of the bare cell, the base unit adhering to the first surface of the bare cell through the adhesion layer.

15. The secondary battery according to claim 1, wherein the substrate molding body is seamlessly and integrally formed with the protection circuit substrate by injection.

16. A secondary battery comprising:
a bare cell for storing electricity;
a protection circuit substrate electrically connected to the bare cell, the protection circuit substrate including a protection circuit for the bare cell;
a substrate molding body formed in the protection circuit substrate;
a first support member coupled to the bare cell, the first support member having a first connection unit that is coupled to the substrate molding body and a base unit connected to a first surface of the bare cell, the first connection unit being disposed on an outer surface of the substrate molding body; and
a connection member for connecting the substrate molding body to the first connection unit.

17. The secondary battery according to claim 16, wherein the first support member further comprises a second connection unit; and
the substrate molding body is disposed between the first connection unit and the second connection unit while being coupled to the first support member.

18. The secondary battery according to claim 17, wherein the second connection unit is disposed on another outer surface of the substrate molding body.

19. The secondary battery according to claim 16, wherein the base unit extends from one edge of the first surface to another edge of the first surface.

20. The secondary battery according to claim 16, wherein the connection member includes a connection bolt for connecting the first connection unit of the first support member to the substrate molding body.

21. The secondary battery according to claim 20, wherein a screw hole is formed on a side of the substrate molding body and a connection hole is formed on the first connection unit of the first support member, the connection bolt penetrating into the screw hole and the connection hole.

22. The secondary battery according to claim 21, wherein a nut is formed inside the screw hole, the connection bolt being coupled to the nut while the substrate molding body is being connected to the first connection unit.

* * * * *